Patented July 14, 1942

2,290,064

UNITED STATES PATENT OFFICE 2,290,064

STABILIZATION OF FOODS

Sidney Musher, New York, N. Y., assignor to Musher Foundation Incorporated, New York, N. Y., a corporation of New York No Drawing. Application April 23, 1940, Serial No. 331,183

6 Claims. (Cl. 99—163)

The present invention relates to retarding oxidative deterioration of oil containing aqueous food compositions and glyceride oils removed from the same and particularly where the glyceride oils removed from the aqueous composition is substantially free of the added antioxygenic material.

It has been found readily possible to add antioxidants or stabilizers directly to many types of glyceride oils, particularly when such antioxidants may not be readily oil soluble or miscible.

It is a primary object of this invention therefore to retard the deterioration of substantially pure oils and particularly of pure glyceride oils and fats by the use of substantially oil insoluble antioxidants or antioxidants that would normally be decreased in effectiveness when added direct to an oil or fat and dissolved therein in comparison to adding the antioxidant in the aqueous phase of an oil dispersion or emulsion.

Further, it has been found that many antioxidants have a substantially weakened action when added to pure oils or fats and only give such oils and fats limited additional stability against rancidity and other forms of oxidative deterioration and it is among the further objects of the present invention to provide an improved method of stabilizing oils and fats and particularly glyceride oils and fats in which the antioxidants may be so utilized and combined with such oils and fats as to give them substantially greater stability and cause them to be substantialy more resistant to the development of oxidative deterioration and rancidity.

It is among the objects of the present invention to provide a method of stabilizing substantially pure oils and fats in such a manner that the antioxygenic effect of the antioxidants may be utilized to the fullest extent without at the same time introducing foreign materials into the oil or fat.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In acordance with this invention, I use desirably water soluble or readily water miscible stabilizing materials for addition to the aqueous phase of an oil containing aqueous composition and preferably a composition in which the oil occupies the dispersed phase and the water the continuous phase, followed preferably by an elevated temperature treatment.

The oil or fat and particularly the glyceride oil or fat to which the present invention will be particularly directed, although not limited, may be dispersed or emulsified or otherwise combined with water and aqueous materials to permit of the treatment according to the present application, or in many cases the oil or fat may be treated in naturally occurring aqueous dispersions.

It has been found that under these conditions many water miscible materials which are not readily oil soluble exercise antioxygenic action when placed in the water phase and out of contact with the oil which they do not exercise when placed in the pure fat or oil itself. Among the materials which may give little or greatly decreased antioxygenic effect when added to a pure oil or fat phase, particularly of a glyceride type, and which give a good effect when aded to an aqueous phase without direct contact with the oil or fat are tyrosine and its esters.

Under these circumstances the water miscible stabilizing material is in the continuous aqueous phase and is not admixed in the dispersed oil or fat phase.

It is usually preferable at this point to heat the material containing the tyrosine at an elevated temperature in excess of 145° F. and desirably in excess of 170° F. or more.

Following the addition of the stabilizing material thereto, the dispersion or emulsion is broken, whereby the oil or fat globules are coalesced and such oil or fat is released from the dispersion or emulsion. The oil globules are coalesced and the dispersion is broken by many means such as by the application of heat, thereto, by centrifuging, rapid agitation, or similar means.

Where the dispersion is broken and the oil or fat globules released by the use of heat, the previously elevated temperature treatment need not have been applied. Where the dispersion is broken, however, by agitation, the heat is desirable for application prior to the breaking of the dispersion.

The tyrosine or its esters may first be heated in water to about 180° F. or more in such proportion as will readily dissolve or become dispersed therein and then added to the aqueous oxidizable composition.

The emulsifying material which serves in the aqueous dispersion to reduce or prevent contact between the dispersed fat or oil and the antioxidant material distributed in the aqueous phase, may be left in the final fat or oil or it may be removed by suitable refining or processing from the final fat or oil which has been broken or segregated from the dispersion and in either case the fat or oil will have unusually high stability and resistance against the development of oxidative deterioration.

Surprisingly, the oil or fat that is obtained following the breaking of the dispersion or emulsion is substantially free of the water miscible tyrosine anti-oxygens added to the aqueous continuous phase of the dispersion or emulsion, but even though the oil or fat is free of the added antioxygenic material, such oil is nevertheless substantially stabilized against oxidative decomposition.

Surprisingly also, where the antioxygen is added to a pure fat or oil, its effectiveness is much less than where it is added to the aqueous continuous phase of an oil or fat in water dispersion or emulsion and the emulsion or dispersion then broken, preferably by a heat treatment, to release the oil and fat globules.

When, for example, tyrosine is added to the aqueous phase of a dispersion containing the glyceride oil subject to oxidation and with the tyrosine remaining dispersed in the aqueous phase, the glyceride oil is substantially stabilized against deterioration and will particularly be stabilized after subjecting the dispersion to an elevated temperature treatment and removing the glyceride oil as by centrifuging, heating, or otherwise breaking the dispersion.

The application of heat is desirable before breaking the emulsion or dispersion or during the breaking of the emulsion or dispersion. The heat employed to break the emulsion or dispersion is at least 150° F. to 170° F. and preferably over 200° F.

For example, from 0.005% to 0.5% by weight of tyrosine or its esters may be very readily added to and mixed in a butterfat emulsion containing 25% to 35% butterfat dispersed in the aqueous phase of the emulsion. This emulsion may be subjected to an elevated temperature such as to about 175° F. for 1 to 5 minutes, cooled and then agitated to release and coalesce the butterfat globules which will be substantially free of the aqueous phase and of the added tyrosine. Such butterfat will be substantially protected against oxidative deterioration even though when the tyrosine is added direct to the pure butterfat in the proportionate quantity, the effectiveness of the tyrosine will not be as great as when utilized in this manner.

The tyrosine may be added to the emulsion or dispersion in an amount ranging from 0.005% to 5% against the weight of the fat or oil contained in the emulsion or dispersion. Generally, it is preferable to use less than 0.5% by weight of the antioxygenic material against the fat or oil weight contained in the emulsion or dispersion and such proportion will under normal circumstances give the best desirable improvement in keeping quality and stabilization of the oil or fat.

In any event, it is desirable for the emulsion to be subjected to an elevated temperature prior to the breaking of the emulsion in order for the desired stabilization to be effected. This stabilization occurs even where the fat globules are subjected to substantial water washing in order to make sure that these water miscible materials are substantially removed during the water washing process.

For example, following the coalescing of the butterfat globules, the butterfat may be washed with water using from 1 to 10 times the amount of water against the weight of the butterfat and the butterfat will nevertheless be substantially stabilized against oxidative deterioration.

As indicated above, the application of heat at the time of the breaking of the emulsion or dispersion or prior to the breaking of such emulsion or dispersion is desirable.

It has been found most satisfactory, either before or during or after the segregation operation to subject the mixture of the fat and oil and the aqueous or readily water miscible materials to a short elevated heat treatment, say at a temperature of above 212° F. and preferably 250° F. for a period varying from 15 seconds to 2 or 3 minutes or more with the result that substantially greater stability is obtained in the final fat material.

In the wet or steam rendering of lard, oleo oil, mutton grease, neat's-foot oil, or other fats and including also the rendering of fish oil, fish liver oils, etc., such as of cod liver oil, herring oil, mackerel oil, menhaden oil, whale oil, etc., the fat is in substantially aqueous suspension at the time of the rendering operation, such fat occupying the dispersed phase and the water occupying the aqueous continuous phase with the fish phospholipin and proteins serving as the emulsifying colloids.

To the rendering kettle as in the rendering of any one of the above materials may be added a relatively small amount, such as less than 3% of the tyrosine and its esters, and after addition to the rendering kettle and the oil or fat emulsion or dispersion subjected to an elevated temperature preferably as high as 220° F. to 250° F., there will be obtained a very substantial increase in the stability of the oil or fat which is rendered by the breaking of the emulsion and the coalescing of the fat or oil globules, the tyrosine remaining in the aqueous phase of the dispersion and with the meat or fish residues.

The stability of the oil or fat that is obtained in this manner will be much greater than where, for example, tyrosine is added to the pure oil or fat after the rendering operation.

*Example I*

Fish slop composed of mackerel heads and tails and containing only about 30% total solids was treated by adding thereto 0.05% by weight of tyrosine against the fat weight of the fish. The fish slop containing about 5% total glyceride oil content in the disperse phase was then heated to 235° F. for 5 hours and the resultant product was centrifuged so that the mackerel oil was removed. The mackerel oil obtained was tested in comparison with mackerel oil to which a proportionate amount of tyrosine had been added. It was observed that the mackerel oil obtained by adding the tyrosine to the mackerel slop and then subjected to the temperature of 235° F. for 5 hours during the rendering process and with the dispersion then broken to release the mackerel oil globules was much improved in keeping quality over the mackerel oil containing the tyrosine added directly thereto.

In the rendering procedure, the higher the temperature at the time the oil is dispersed in the aqueous continuous phase in the presence of the water miscible antioxygenic material, the greater the stabilization or antioxygenic action exerted upon the oil.

For example, it seems desirable for the rendering to be conducted at a temperature of about 220° F. to 250° F. or even higher and where the rendering is conducted at temperatures as high as 300° F. to 350° F. in the presence of these water miscible antioxygenic materials, even greater stabilization is obtained than where the lower temperatures are employed. Where the tyrosine is merely added to and heated directly in the pure fat or oil, the desirable results of the present invention are not obtained.

In accordance with this invention, the antioxidants described may be added to the aqueous phase of an oil that is in the process of refining such as in the process of causticating where large quantities of moisture are present and where the antioxidant may be employed in the aqueous phase in the course of such refining process to give protection to the fat phase. Following the addition of the water miscible antioxidants to the water phase in the course of the refining of such oils, such as of cottonseed oil, corn oil, soya bean oil, etc., and following the breaking of the emulsion or dispersion, the oil is released free of the antioxidant but nevertheless stabilized against oxidative deterioration.

In accordance with this invention an oil or fat may be placed into a dispersed or emulsified form, treated with the water miscible antioxygenic material and the emulsion or dispersion broken. Another method is to start with an oil or fat which normally occurs in its emulsified or dispersed phase and to treat that emulsion with the water miscible antioxygenic material. Then the emulsion or dispersion may be treated at an elevated temperature to break the emulsion.

In addition to the treatment of the glyceride oils or fats, mineral oils may similarly be treated to stabilize them, as in the preparation of emulsions with the mineral oil in the dispersed phase and containing the antioxygenic material in the aqueous continuous phase.

This invention may also be employed in the steam distillation of the essential oils, such as geraniol, oil of orange, oil of lemon, etc. When an antioxygenic water miscible material such as tyrosine described above is added to the aqueous continuous phase of the material from which these various oils are distilled by steam distillation, and where the temperature of distillation is at least at 150° F. and preferably at 175° F. or higher, the oils will be substantially stabilized against oxidative deterioration and materially improved in keeping quality.

The process of the present invention is particularly advantageous in that it eliminates from the final oil or fat any objections of impurities or contamination as might result from the antioxidants. While many antioxidants are objectionable from the viewpoint of labeling, edibility, etc., when the oil or fat is prepared in a condition substantially free of the antioxidants, apparently a much higher grade of oil or fat is obtained which need not be labeled or contaminated.

Although this invention relates particularly to the stabilization of glyceride oils that are released from the dispersed phase of an emulsion, nevertheless it has also been observed that where the water miscible antioxygens, such as tyrosine, are added to the aqueous continuous phase of the emulsion containing the oil or fat globules in the dispersed discontinuous phase and particularly where such emulsions are then subjected to an elevated temperature such as to in excess of 170° F. and desirably in excess of 220° F., even where the emulsion is not subsequently broken and the oil is retained in the discontinuous phase of the emulsion with the tyrosine present in the aqueous continuous phase, the said dispersed oil or fat globules will be substantially stabilized against oxidative deterioration, although, in accordance with this invention, the oil or fat globules may desirably be coalesced and removed from the emulsified form.

For example, tyrosine or its esters may be added to a heated mass of fish solids such as to an oil containing aqueous dispersion of herring, salmon, sardine, or menhaden waste. The mass containing the added tyrosine or similar product is then heated to at least about 200° F. and the resultant fish oils may either be rendered therefrom or the fish meals containing their full oil content will be substantially stabilized against deterioration and are much more stabilized than if, for example, the tyrosine had been added directly to the pure fish oil, even if heated to the same temperature.

In a similar manner, tyrosine or its esters may be added to oil containing aqueous cereal dispersions and particularly those containing high proportions of cereal germs. Where the tyrosine is added to the cereal dispersed in a heated aqueous medium, stabilization of the cereal is obtained.

Tyrosine may also be combined with a sugar, preferably crystallized cane or dextrose sugar, in a relatively small proportion such as in an amount of from about 0.05% to 2%. The sugar containing the tyrosine may then be utilized for addition to aqueous oxidizable organic compositions, the tyrosine and sugar combination occupying the aqueous continuous phase but nevertheless protecting the discontinuous oil phase against oxidative deterioration. The results obtained by the combination of tyrosine and sugar, particularly where the organic composition after treatment with the tyrosine sugar combination is subjected to a temperature in excess of about 145° F. and preferably to over 170° F., are far better than where the tyrosine is added direct to the oil contained in the organic composition.

Tyrosine may less preferably be employed in combination with salt for use in wet brining or curing procedures. For example, between 0.5% and 5% of tyrosine may be combined with salt preferably by adding at the close of the drying of the salt, and while the salt is at a temperature of between about 225° F. and 325° F. The salt may then be used in the brining or curing of fatty meats or fish such as of bacon, herring, salmon, sardines, tuna fish, etc., or in the curing of leather or similar organic oxidizable material and the resultant product will be substantially stabilized against oxidized deterioration, although the tyrosine itself is not dissolved in the oil and apparently does not become dissolved in the oil or fat of the finished composition.

The tyrosine or its esters may also be added to and dispersed in the aqueous continuous phase of an essential oil or hydrocarbon oil containing dispersion or emulsion in order to stabilize the essential oil or hydrocarbon oil contained therein against oxidative deterioration.

Where, for example, lemon oil, orange oil and other essential oils or mineral oil is dispersed in an aqueous composition and is readily subject to oxidation, the tyrosine may be added to and dispersed in the aqueous phase of that emulsion.

It has been found particularly desirable to utilize the tyrosine or its esters in a form in which it is easily dispersed in the aqueous phase.

For example, tyrosine or its esters may desirably be first dissolved in water, preferably boiling water, and then added to the aqueous phase of the oil containing oxidizable emulsion, and particularly where the emulsion is treated at the elevated temperature and the oil contained in the emulsion is then released from the dispersion or emulsion and is substantially stabilized against oxidative deterioration.

Among the various esters of tyrosine that may particularly be included are the various alkyl esters such as methyl, propyl, etc. esters of tyrosine, and phenyl and glyceryl esters which may be utilized in part or whole replacement for the tyrosine.

Among the other compounds which may be utilized are those having the general formula $RNH_2.COOH$ in which R represents an aryl, alkyl, alkaryl or aralkyl radical having from 3 to 30 carbon atoms and where the H or OH of the COOH may be replaced by aryl, alkyl, alkaryl or aralkyl.

The preferred compounds are those having the general formula $C_6H_5.CHNH_2.COOH$ in which one or more of the hydrogens may be replaced by one of the above mentioned organic radicals so that the final compound has up to 20 carbon atoms.

Suitable water solubilizing groups may be included, such as the phospho and less preferably the sulfo groups, in the phenyl or aryl nucleus to render the compound more readily water soluble or miscible.

By the expression "tyrosine" are also included the esters thereof and preferably such esters as are readily miscible or soluble in water.

Together with the tyrosine and its esters, and in combination therewith, there may be employed for addition to the aqueous oil containing oxidizable composition (a) sugars, including cane and beet sugars, blackstrap molasses, and particularly the simple mono-saccharide sugars such as dextrose; (b) phosphatides such as lecithin, phospholipins, phosphoric acid or acid phosphates; (c) hydroquinone and derivatives thereof and also other polyhydroxy benzenes, naphthalenes and aminophenols; (d) polyhydroxy, polycarboxy aliphatic acids such as tartaric acid, citric acid, malic acid, etc. Combinations of tyrosine and products of the group (a) to (d) above are particularly effective in about equal proportions when dispersed in the aqueous oxidizable composition which may then be desirably subjected to a temperature of over about 170° F. and preferably over 200° F.

Together with or in lieu of tyrosine, there may also be utilized the substantially water soluble proteins, proteoses and peptones.

Casein may also be employed in accordance with the present invention where it exercises an antioxygenic effect particularly under conditions of treatment at over about 200° F. in the presence of oxidizable organic oil containing aqueous compositions.

There may also be utilized the glucamines as well as the reaction products between sugar and ammonia where these materials are added to the aqueous continuous phase of oxidizable oil containing aqueous compositions in order to stabilize the oil removed from the composition particularly after subjecting the combination to an elevated temperature treatment prior to the separation of the oil therefrom.

The present application is a continuation in part of applications, Serial No. 298,642 filed October 9, 1939, now Patent No. 2,198,213, and Serial No. 237,466 filed October 28, 1938, now Patent No. 2,198,216 and through said applications continues in part the subject matter of application Serial No. 249,990, filed January 9, 1939, now Patent No. 2,176,027.

Having described my invention, what I claim is:

1. A process of stabilizing glyceride oils subject to oxidative deterioration whereby they become less subject to such deterioration, which comprises adding a small amount of a compound selected from the group consisting of tyrosine and its esters to the aqueous continuous phase of a dispersion containing glycerides in the disperse phase thereof, subjecting the dispersion to at least 145° F. and then breaking the dispersion to obtain stabilized glyceride oils substantially devoid of the compound contained in the original aqueous continuous phase.

2. A process of stabilizing glyceride oils subject to oxidative deterioration whereby they become less subject to such deterioration, which comprises adding a small amount of tyrosine to the aqueous continuous phase of a dispersion containing glycerides in the disperse phase thereof, subjecting the dispersion to at least 145° F. and then breaking the dispersion to obtain stabilized glyceride oils substantially devoid of the tyrosine contained in the original aqueous continuous phase.

3. A process of making a stabilized butterfat composition which is normally subject to oxidative deterioration and whereby it becomes less subject to such deterioration, which comprises adding a small amount of a compound selected from the group consisting of tyrosine and its esters to a butterfat emulsion, heating to at least 145° F., and then breaking the emulsion to remove a stabilized butterfat composition which is substantially free of the added compound.

4. A process of making a stabilized butterfat composition which is normally subject to oxidative deterioration and whereby it becomes less subject to such deterioration, which comprises adding a small amount of tyrosine to a butterfat emulsion, heating to at least 145° F., and then breaking the emulsion to remove a stabilized butterfat composition which is substantially free of the tyrosine.

5. A process of making a stabilized butterfat composition which is normally subject to oxidative deterioration and whereby it becomes less subject to such deterioration, which comprises adding a small amount of a compound selected from the group consisting of tyrosine and its esters to a butterfat emulsion containing 25% to 35% butterfat dispersed in the aqueous phase thereof, heating to at least 145° F., and then agitating to coalesce the butterfat globules to remove a stabilized butterfat composition substantially free of the added compound.

6. A process of making a stabilized butterfat composition which is normally subject to oxidative deterioration and whereby it becomes less subject to such deterioration, which comprises adding a small amount of tyrosine to a butterfat emulsion containing 25% to 35% butterfat dispersed in the aqueous phase thereof, heating to at least 145° F., and then agitating to coalesce the butterfat globules to remove a stabilized butterfat composition substantially free of the tyrosine.

SIDNEY MUSHER.